(12) United States Patent
Krause et al.

(10) Patent No.: US 7,068,188 B1
(45) Date of Patent: Jun. 27, 2006

(54) RUNWAY APPROACH LIGHTING SYSTEM AND METHOD

(75) Inventors: Kenneth Nicholas Krause, Madison Heights, MI (US); Vincent Robert Busby, Windsor (CA)

(73) Assignee: Controlled Power Company, Troy, MI (US)

( * ) Notice: Subject to any disclaimer, the term of this patent is extended or adjusted under 35 U.S.C. 154(b) by 190 days.

(21) Appl. No.: 10/863,421

(22) Filed: Jun. 8, 2004

(51) Int. Cl.
*B64F 1/18* (2006.01)

(52) U.S. Cl. .................. 340/953; 340/947; 315/130; 244/114 R

(58) Field of Classification Search ............... 340/947, 340/951, 952, 953; 315/130; 244/114 R
See application file for complete search history.

(56) References Cited

U.S. PATENT DOCUMENTS

| | | | |
|---|---|---|---|
| 3,710,157 A | 1/1973 | Wright | |
| 3,715,741 A | 2/1973 | McWade et al. | |
| 3,795,905 A | 3/1974 | Wright | |
| 3,828,334 A | 8/1974 | Wallace | |
| 3,829,735 A | 8/1974 | Berlock et al. | |
| 3,964,015 A | 6/1976 | Collins | |
| 4,095,140 A | 6/1978 | Kirkhuff et al. | |
| 4,138,627 A | 2/1979 | Camic | |
| 4,216,413 A | 8/1980 | Plas | |
| 4,297,632 A | 10/1981 | Glaser et al. | |
| 4,449,073 A | 5/1984 | Mongoven et al. | |
| 4,486,691 A | 12/1984 | Beggs | |
| 5,408,171 A * | 4/1995 | Eitzmann et al. | 323/258 |
| 5,446,277 A | 8/1995 | Rutter | |
| 5,519,618 A | 5/1996 | Kastner et al. | |
| 5,638,057 A | 6/1997 | Williams | |
| 5,969,642 A * | 10/1999 | Runyon et al. | 340/953 |
| 6,028,535 A | 2/2000 | Rizkin | |
| 6,573,840 B1 | 6/2003 | Norman et al. | |

* cited by examiner

*Primary Examiner*—Benjamin C. Lee
*Assistant Examiner*—Hongmin Fan
(74) *Attorney, Agent, or Firm*—Reising, Ethington, Barnes, Kisselle, P.C.

(57) ABSTRACT

A method and system for visually guiding an aircraft in its landing approach to a runway having an approach area equipped with approach lights operable in off, low, medium, and high intensity states. The lights are communicated with a secondary side of a transformer, which has a primary side with low, medium, and high taps that correspond to the light states. Off, low, medium, and high lighting intensity requests correspond to the low, medium, and high states of the plurality of lights. AC power is switched between the transformer taps in response to a request for an increase in lighting intensity. Power is sequentially applied to the taps by supplying the power to the low tap for a first predetermined time interval before supplying the power to the medium tap.

17 Claims, 15 Drawing Sheets

RUNWAY APPROACH LIGHTING SYSTEM AND METHOD

FIELD OF THE INVENTION

This invention relates generally to aircraft indicating systems and methods, and more particularly to visual aircraft landing guidance systems and methods.

BACKGROUND OF THE INVENTION

Visual landing guidance systems for aircraft are widely used throughout the world as an aid for guiding an aircraft in descent to a runway. Such systems include the medium intensity approach lighting system with runway alignment indicator lights (MALSR), developed by the United States Federal Aviation Administration (FAA). In general, MALSR provides visual guidance to landing aircraft in an approach area of an active landing runway. More specifically, MALSR provides visual information regarding the lateral position of approaching landing aircraft relative to the location of the runway centerline and thereby enables an aircraft pilot to acquire the runway centerline well in advance of landing the aircraft, especially in low visibility conditions.

A typical MALSR includes a combination of three independent guidance lighting arrays that are laid out on a runway approach and that include a threshold array, a steady-burning array, and a sequenced flasher array. FIG. 5 depicts a typical MALSR lighting arrangement. The threshold array includes 18 to 32 steady-burning light sources that are arranged in a line perpendicular to the centerline of the runway, at the threshold of the runway. The steady-burning array includes nine light bars, each having five steady-burning light sources mounted thereto. Seven of the lightbars are evenly spaced at intervals of 200 feet, beginning 200 feet from the runway threshold. The other two lightbars, or wing lights, are disposed on either side of the lightbar at the 1,000 foot mark. The sequenced flasher array includes 5 to 8 flasher light sources that are evenly spaced at intervals of 200 feet, beginning 1,600 feet from the runway threshold. In operation, the sequenced flasher array gives the appearance of a rolling ball of light headed toward the runway down the centerline thereof. The lighting arrays operate in accordance with an off mode and an on mode having three different levels of lighting intensity—low, medium, and high.

Unfortunately, however, current MALSR's are susceptible to relatively frequent electrical failure. For example, the circuitry and components of MALSR's are susceptible to severe direction swings and magnitude surges in transformer excitation currents, typically caused by unintentional simultaneous operation of two of the three lighting intensity levels when switching between the different levels. These swings and surges yield damaging electrical transients that lead to overstressing and premature failure of transformers, switch contactors, control circuit boards, the lamps and the like. Moreover, the lightbars are particularly vulnerable to lightning strikes, which fault out the MALSR. As a result of the above types of electrical failures, the MALSR must be diagnosed and repaired to return the MALSR to normal operation, which can take hours or days. Diagnosis, repair, replacement of prematurely failed components, or simple reset of the MALSR creates guidance system down-time that, at best, is time consuming and expensive, and, at worst, increases the risk of landing an aircraft.

SUMMARY OF THE INVENTION

According to one aspect of the present invention, there is provided an aircraft landing guidance system for visually guiding an aircraft in its landing approach to a runway having an approach area equipped with a plurality of lights operable in accordance with a plurality of intensity states including at least an off state, a low state, a medium state, and a high state. The plurality of lights is communicated to a secondary side of a transformer, which also has a primary side with a plurality of taps including at least low, medium, and high taps that correspond respectively to the low, medium, and high states of the plurality of lights. The system includes at least one input source for requesting the plurality of lights to operate in accordance with the plurality of intensity states. The at least one input source receives a plurality of lighting intensity requests including an off request, a low request, a medium request, and a high request that correspond respectively to the low, medium, and high states of the plurality of lights. The at least one input source is capable of receiving a request for an increase in lighting intensity from one of the states to another. The system also includes a plurality of power input lines communicated to the plurality of taps of the transformer. The plurality of power input lines includes a low line, a medium line, and a high line that correspond respectively to the low, medium, and high taps of the transformer. The system further includes a plurality of switches for switching between the plurality of taps of the transformer and includes a low tap switch in the low line, a medium tap switch in the medium line, and a high tap switch in the high line. The system additionally includes a control module in communication with the at least one input source and the plurality of switches. The control module includes control logic for controlling operation of the plurality of switches in a predetermined sequential manner based on input received from the input source. The control logic activates at least one of the plurality of switches in response to the request for an increase in lighting intensity from the input source. The control logic first activates the low tap switch for a first predetermined time interval before activating the medium tap switch for at least a second predetermined time interval.

According to another aspect of the present invention, there is provided a method of visually guiding an aircraft in its landing approach to a runway having an approach area equipped with a plurality of lights operable in accordance with a plurality of intensity states including at least an off state, a low state, a medium state, and a high state. The plurality of lights is communicated with a secondary side of a transformer, which also has a primary side with a plurality of taps including at least low, medium, and high taps that correspond respectively to the low, medium, and high states of the plurality of lights. The method includes a step of receiving and processing a plurality of lighting intensity requests including an off request, a low request, a medium request, and a high request that correspond respectively to the low, medium, and high states of the plurality of lights. The method also includes a step of switching supply of AC power between the plurality of taps of the transformer in response to a request for an increase in lighting intensity from the receiving and processing step. The switching step includes sequentially supplying the power to the plurality of taps by supplying the power to the low tap for a first predetermined time interval before supplying the power to the medium tap.

At least some of the objects, features and advantages that may be achieved by at least certain embodiments of the invention include providing a system that provides forced progressive increases in lighting intensity to prevent jumps from off or low intensity settings to medium or high intensity settings thereby minimizing transformer excitation; prevents simultaneous operation of switches without power dropout; extends the life of approach lighting lamps; allows for bypass operation; reduces operating expenses and runway downtime; is of relatively simple design and economical manufacture and assembly; and is reliable and has a long, useful service life.

Of course, other objects, features and advantages will be apparent in view of this disclosure to those skilled in the art. Other systems or methods embodying the invention may achieve more or less than the noted objects, features or advantages.

BRIEF DESCRIPTION OF THE DRAWINGS

These and other objects, features and advantages of the present invention will be apparent from the following detailed description of the preferred embodiment and best mode, appended claims, and accompanying drawings in which:

DETAILED DESCRIPTION OF THE PREFERRED EMBODIMENTS

Figure 1:
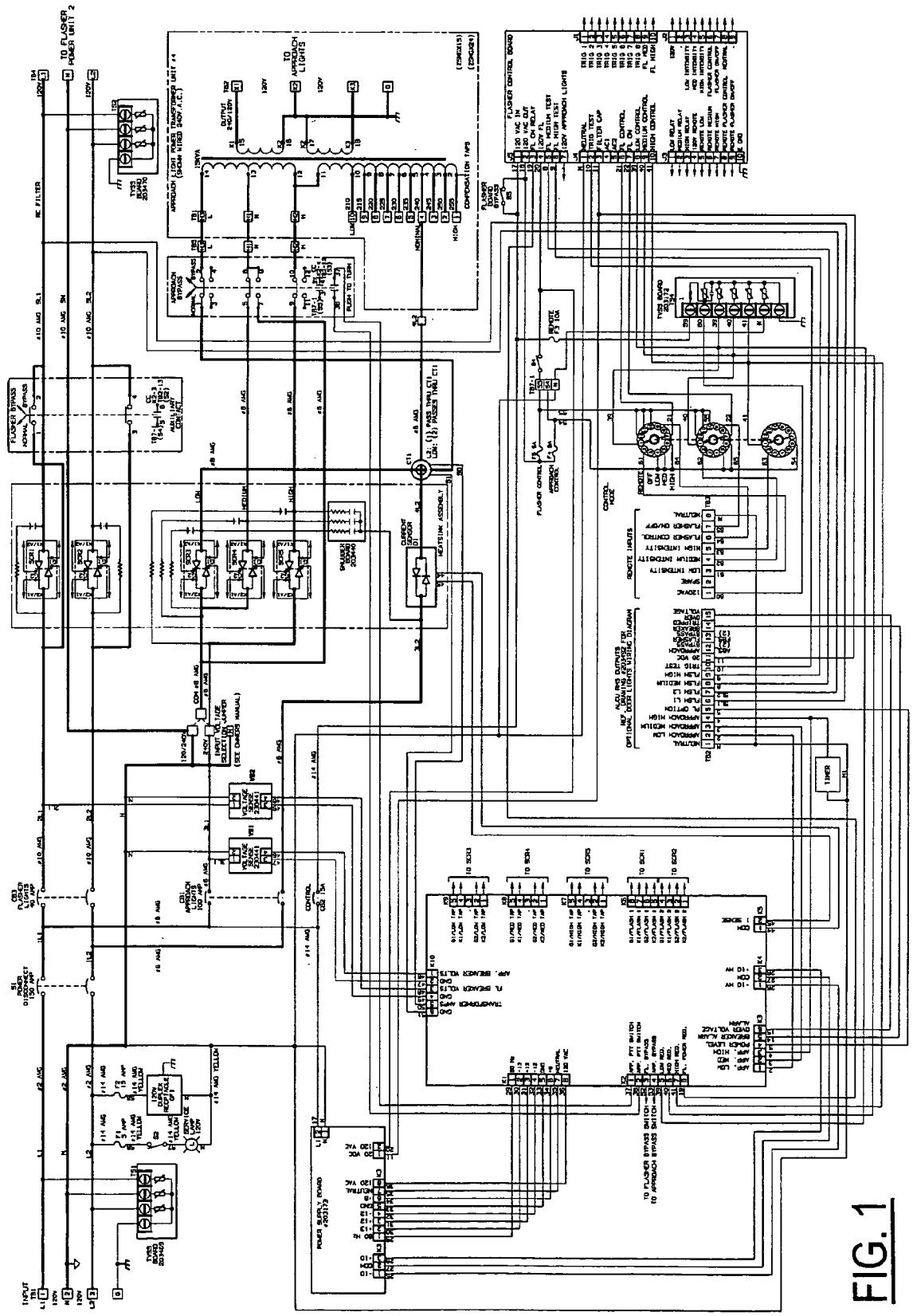
FIG. 1 is a single schematic diagram of a MALSR control system according to one embodiment of the present invention.
Figure 1A:
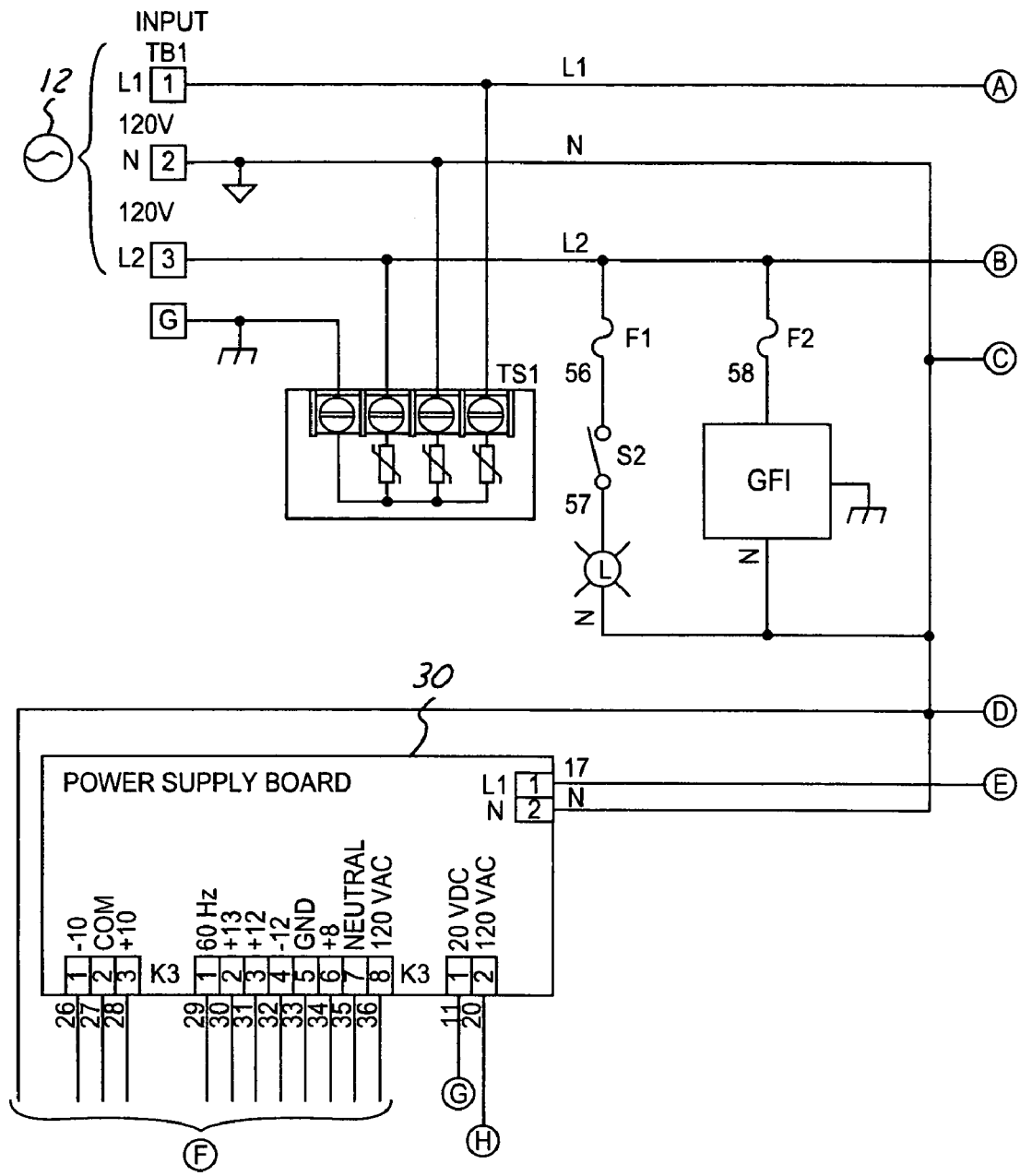
FIGS. 1A–1H collectively comprise the single schematic diagram of FIG. 1 in greater detail.
Figure 1B:
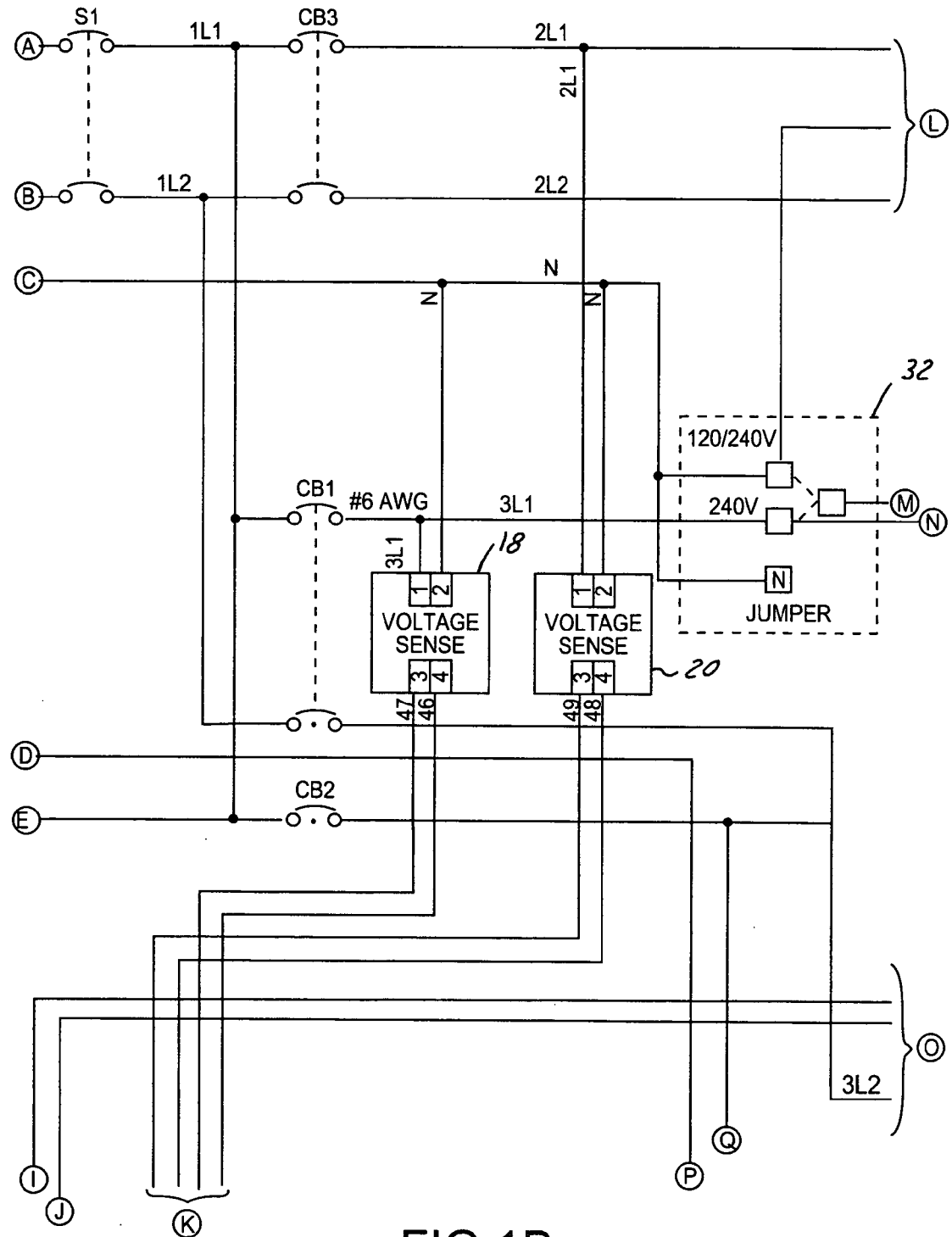
Figure 1C:
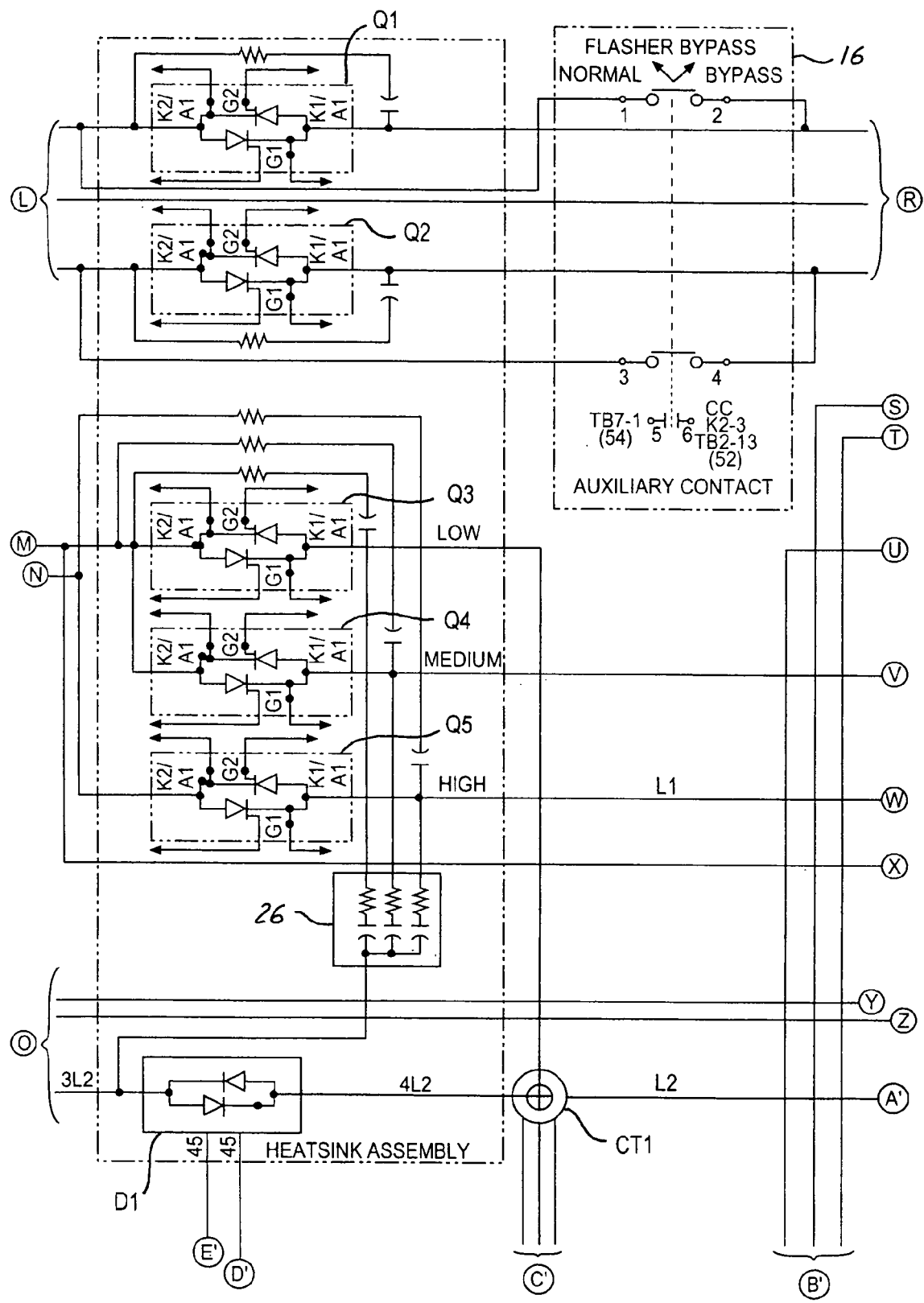
Figure 1D:
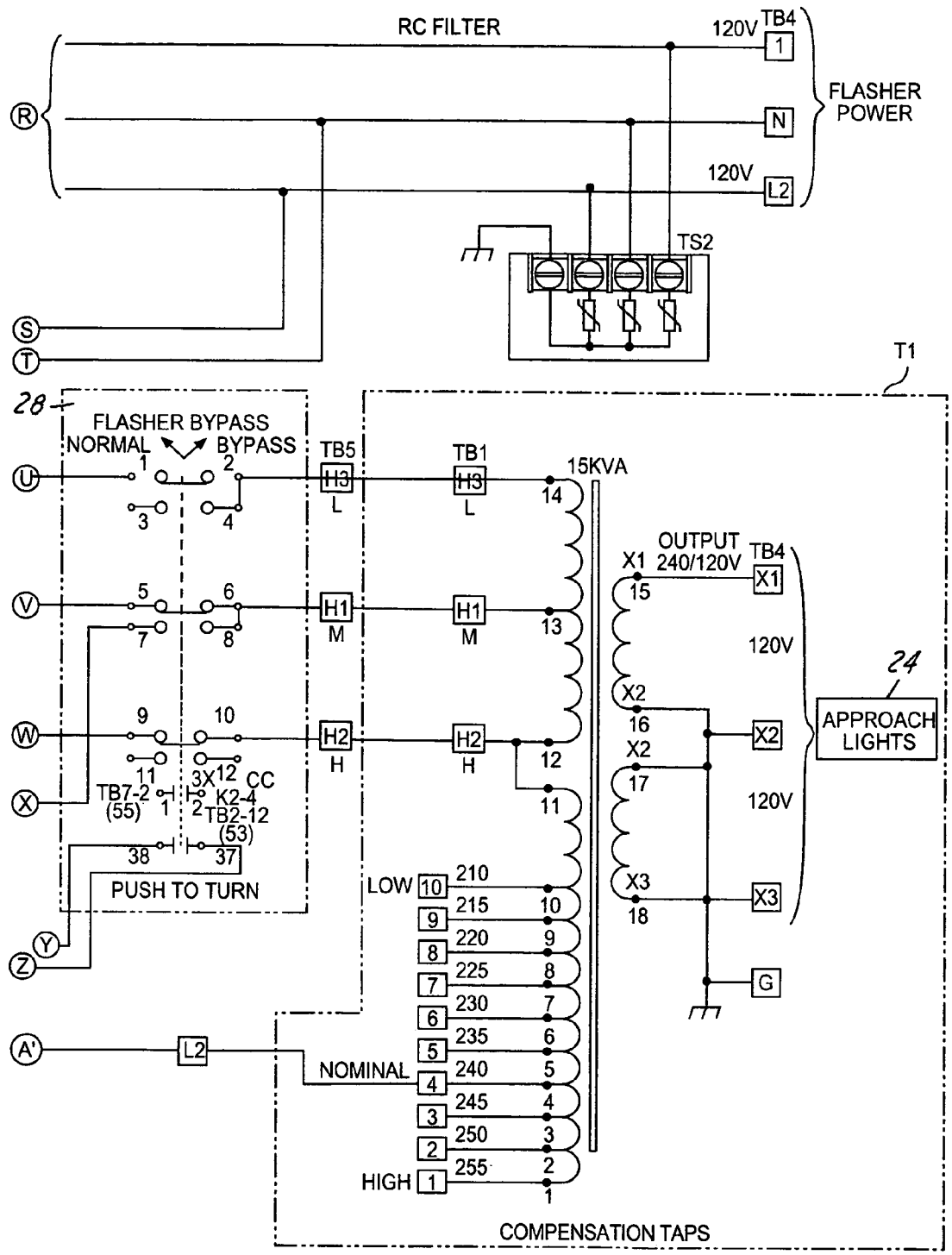
Figure 1E:
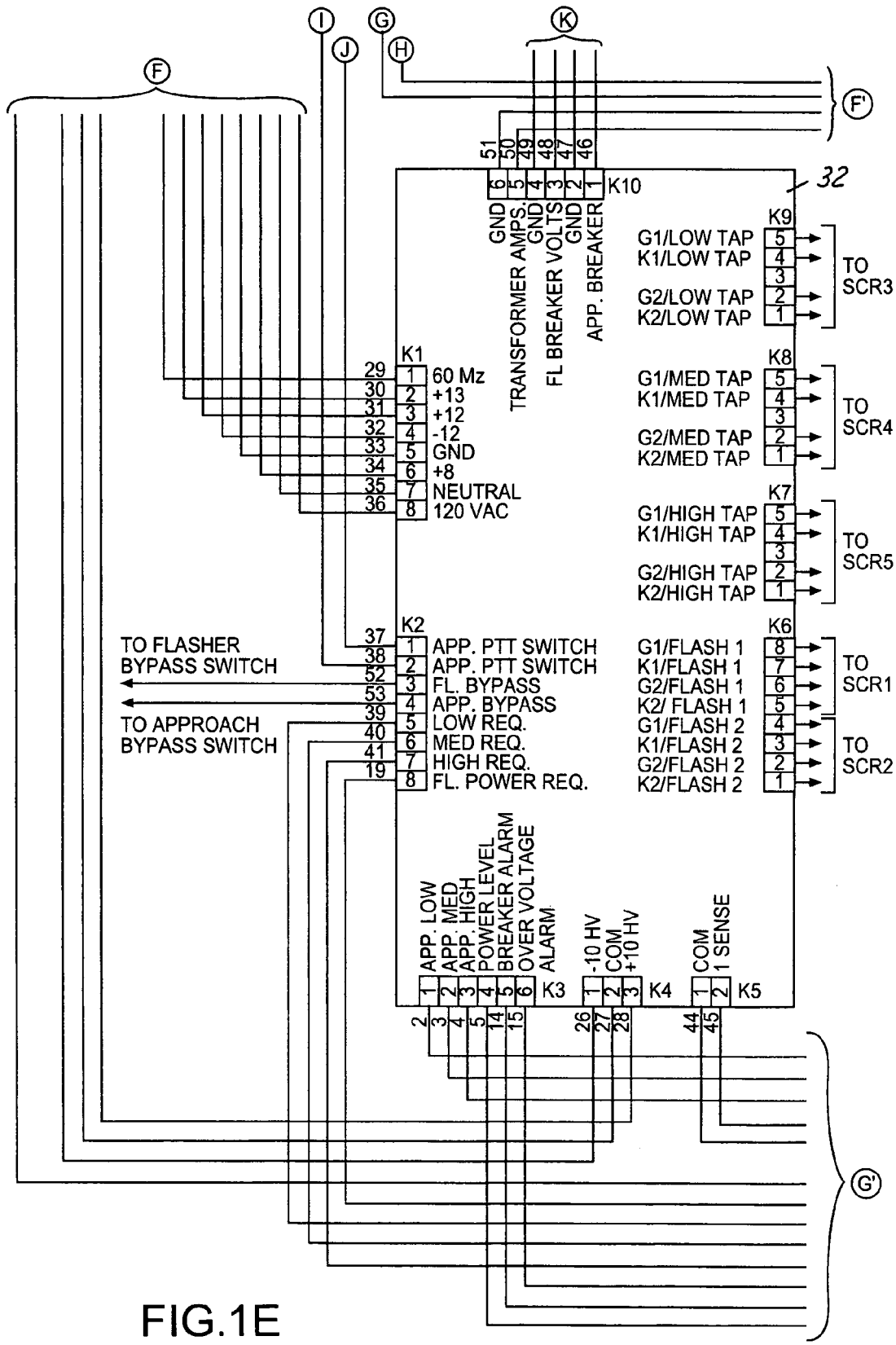
Figure 1F:
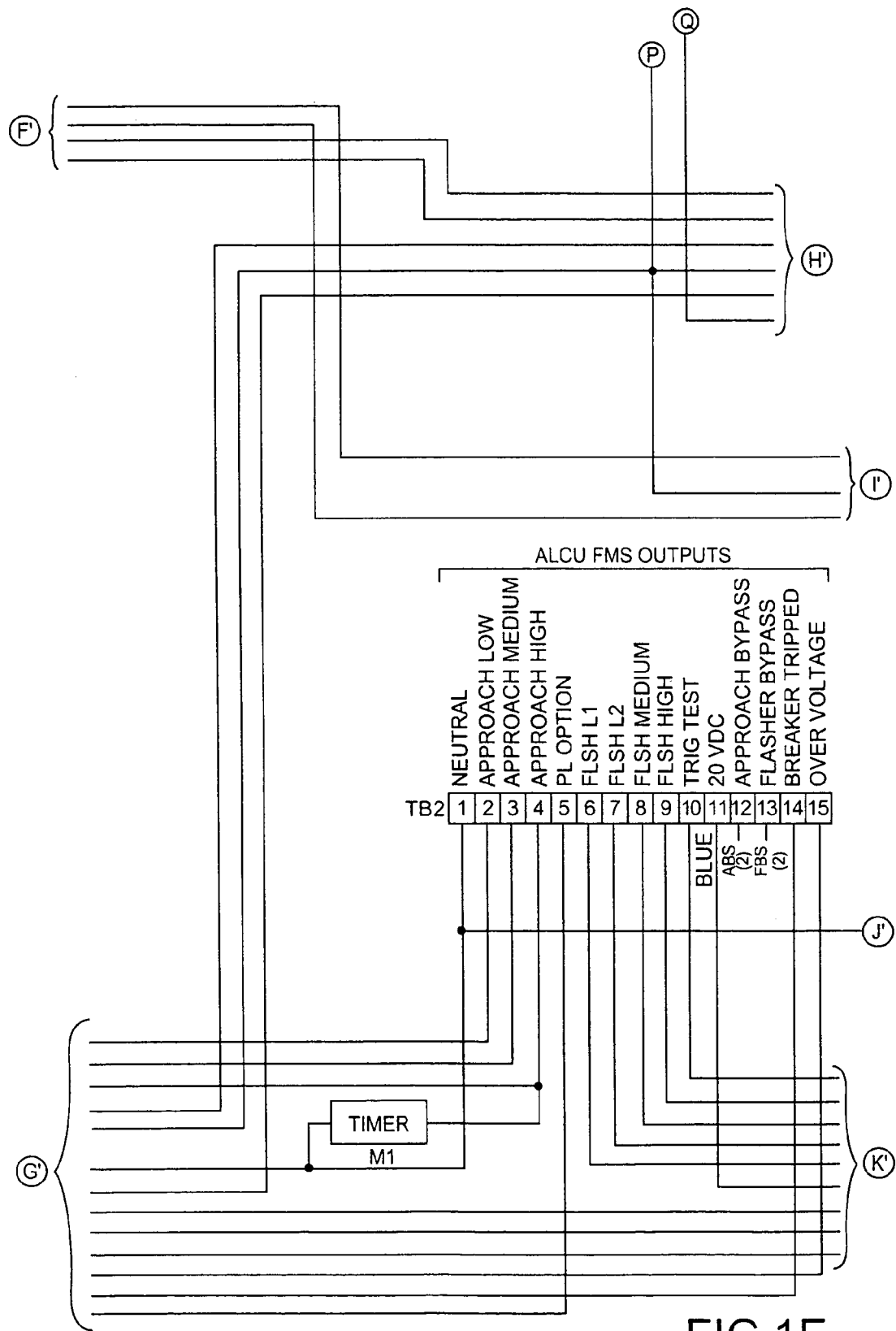
Figure 1G:
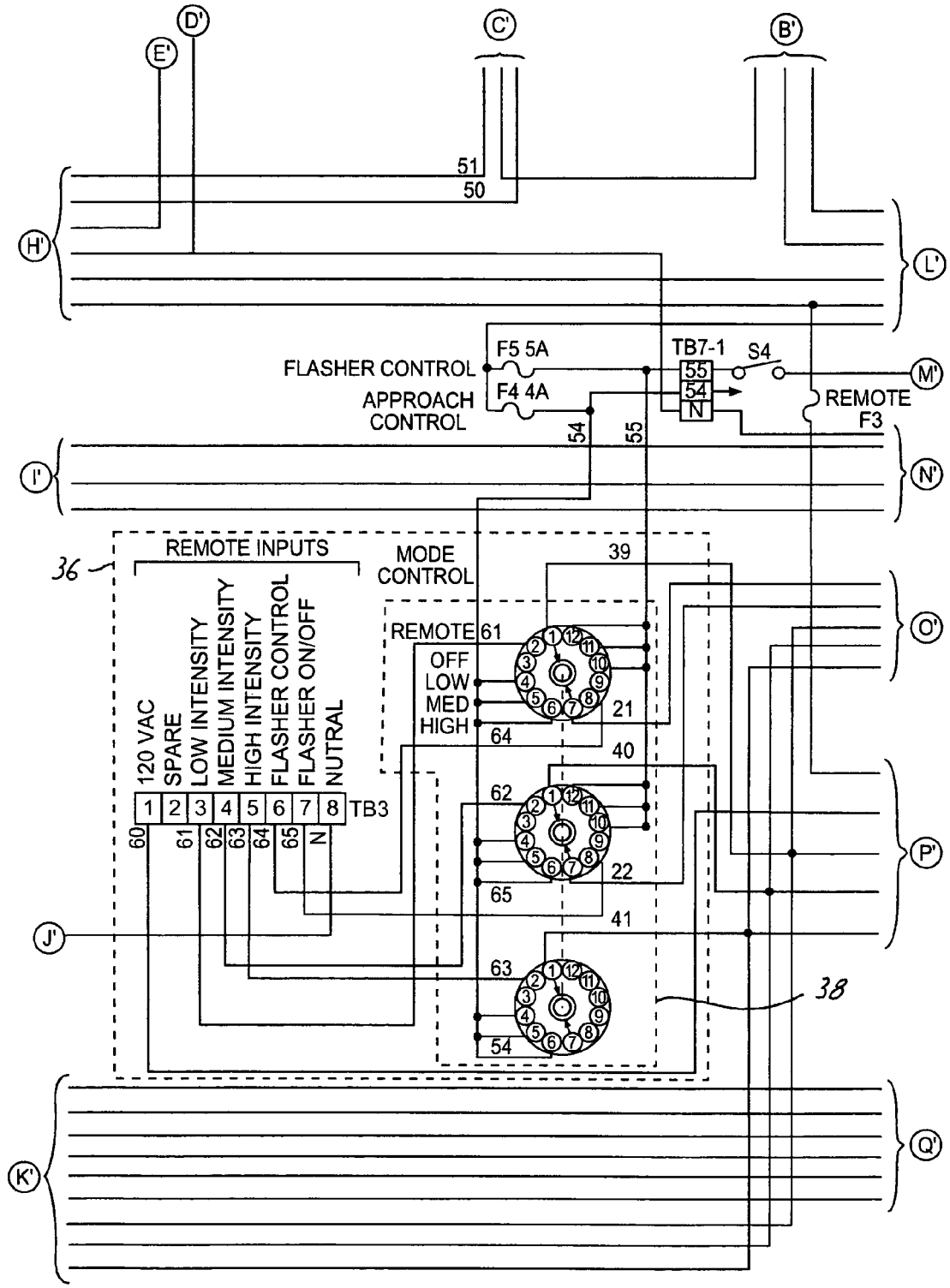
Figure 1H:
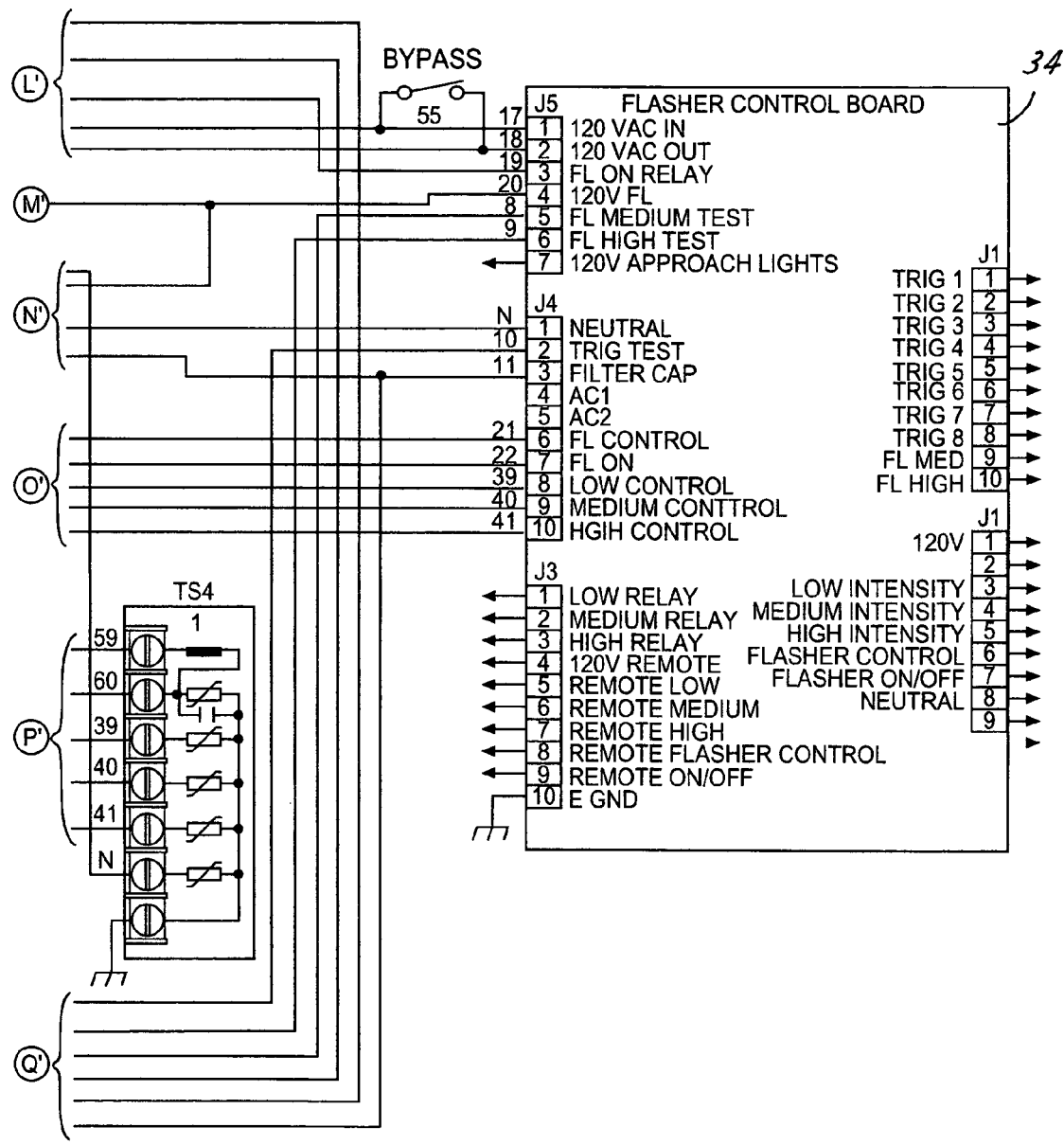

Referring in detail to the drawings, FIGS. 1–1H illustrate a schematic diagram of a portion of an aircraft landing guidance system 10 according to an embodiment of the present invention. The system 10 described herein generally provides controlling, bypassing, and power transforming for steady-burner approach lighting, and further includes interfacing to an approach light flasher system. As such, the system 10 is provided primarily for powering and controlling the operation of steady-burning approach lights, as opposed to approach flashers or approach threshold lights. In any case, the present invention also contemplates systems and methods for controlling flashers and threshold lights in the same or a similar manner as described herein with respect to the approach lights. The system 10 of FIGS. 1–1H is comprised of control circuitry and power circuitry.

In the power circuitry portion of the system 10, a power source 12 provides a supply of 120/240 or 240 Volt, 60 Hertz power, and is connected to a flasher array 14 via a line L1, a line L2, and a line N. The power source 12 is also connected to a primary side of an approach light power transformer T1 via power input lines L1, L2, and N. Line L1 and line N are controlled power lines, which are respectively connected to high, and low and medium taps of the transformer primary. Line L2 is a common power line, which is connected to a nominal tap of compensation taps of the transformer primary. A 150 amp power disconnect S1 is provided between the power source 12 and both of the transformer T1 and the flasher array 14.

In a flasher portion of the power circuitry, a 40 amp circuit breaker CB1 is provided downstream of the disconnect S1. The flasher portion further includes a first switch Q1 in line L1 and a second switch Q2 in line L2, both of which are provided for on-off switching of power that is supplied from the power source 12 to the flasher array 14, as will be described further herein below with respect to the control circuitry. Downstream of the switches Q1, Q2, a manual flasher-control bypass switch 16 is provided to disconnect the flasher array 14 from the switches Q1, Q2 and thereby provide a direct supply of power from the power source 12 to the flasher array 14. In this way, the flashers can be powered until the system can be diagnosed in the event of control module malfunction.

In an approach light portion of the circuit, downstream of the power disconnect S1, a 100 amp circuit breaker CB1 is provided in L1 and L2. Just downstream of the circuit breaker CB1, a voltage sensor 18 is provided in communication with line N and line L1 for purposes that will be described in more detail herein below. A similar voltage sensor 20 is provided in communication with line N and line L1 in the flasher portion of the circuit for a similar purpose. Downstream of the voltage sensors 18, 20 an input voltage selection jumper 22 is provided to accommodate use of either a 240V/120V transformer T1 as shown or, alternatively, a 240V transformer.

A plurality of switches Q3, Q4, Q5 is provided for changing taps on the transformer T1 to effectuate changes in the approach light operational modes between low, medium, and high intensities. The plurality of switches includes a low tap switch Q3, a medium tap switch Q4, and a high tap switch Q5. The switches Q3, Q4, Q5 are controlled in a manner that will be described in further detail below with respect to the control circuitry. Although the switches Q3, Q4, Q5 may be of any suitable construction, they are preferably discrete, solid-state, inverse-parallel, silicon-controlled-rectifiers (SCR's). The SCR's of the present invention may be any suitable semiconductor device but are preferably a Semikron® SKKT 91/12 or SKKT 250/12 from Semikron International of Nurnberg, Germany, or a eupec®TT92N1200K or TT250N12K available from eupec Company of Warstein, Germany. Although less desirable, the present invention also contemplates use of mechanical contactor switches or other solid-state devices such as Crydom® relays. Crydom relays typically include solid-state switches, but also include gating mechanisms, RC circuitry, and snubber circuitry, and are typically of relatively lower capacity, rated in the 1,000 Volt/100 Amp range with a typical surge rating on the order of about 1,000 Amps for about ¼ of a cycle. In contrast, however, a discrete SCR is a stand-alone device of relatively higher capacity, rated in the 1,600 Volt/250+Amp range with a surge rating on the order of about 8,000 Amps for about ½ of a cycle. In other words, the discrete SCR provides a more robust and reliable switching mechanism for the high surges and swings in power that are present in a MALSR.

Figure 5:
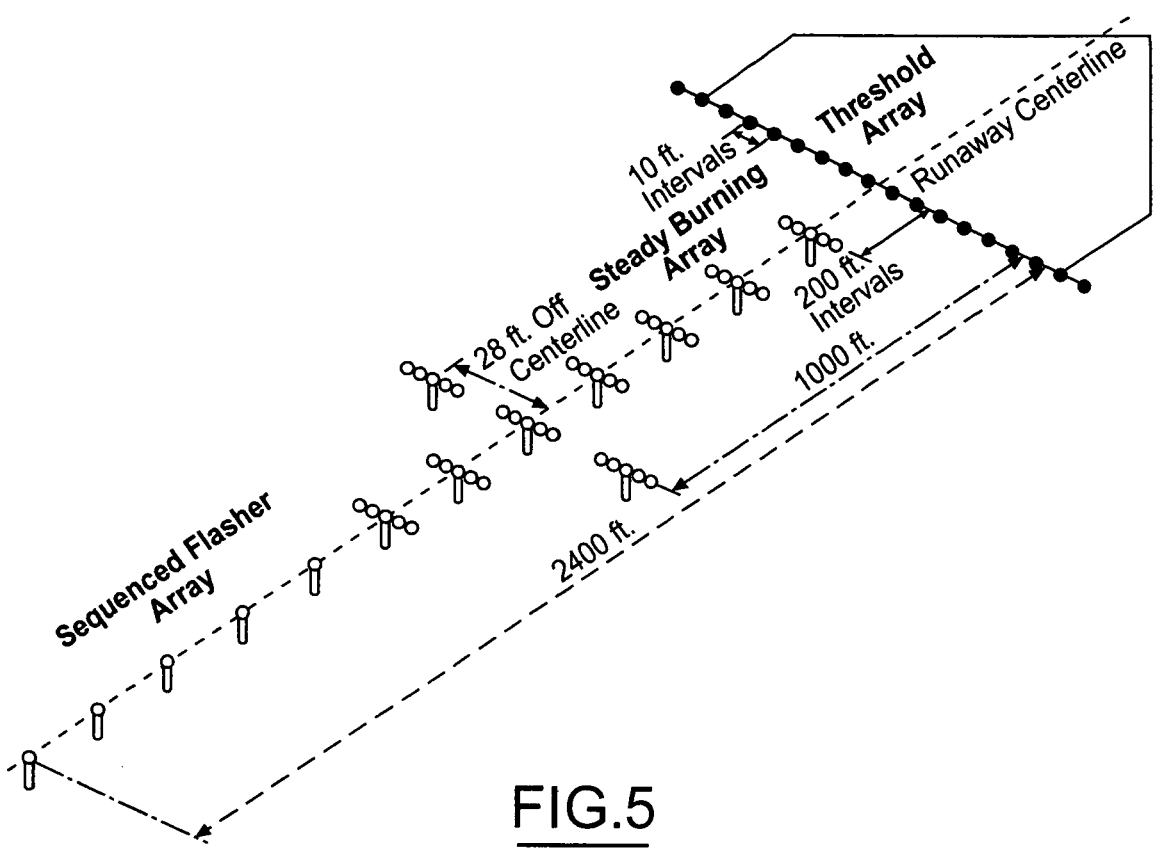
FIG. 5 is a perspective view of a runway approach area equipped with approach lights.

Low tap switch Q3 is provided in a "low" line or branch of line N and, when closed, enables a first or low voltage input to the transformer T1 to operate a plurality of approach lights 24 in a first or low intensity state. The approach lights 24 may be approach lights, light-emitting-diodes, or the like. The approach lights 24 are connected to a secondary side of the transformer T1 and are operable in accordance with a plurality of intensity states including an off state and at least three on states including a low state, a medium state, and a high state. The various on states represent different power levels of the plurality of lights 24 and correspond in kind to the low, medium, and high taps on the transformer primary. The lights 24 are the approach lights, but may also be the flashers or threshold lights such as those shown in FIG. 5. The low voltage is, for example, on the order of 75 Volts to provide about 400 to 720 Candela in the approach lights. Medium tap switch Q4 is provided in a "medium" branch of line N and, when closed, enables a second or medium voltage input to the transformer T1 to operate the approach lights 24 in a medium intensity mode. The medium voltage is, for example, on the order of 150 Volts to provide about 2,000 to 3,600 Candela in the approach lights. High tap switch Q5 is provided in a "high" line, line L1. And, when closed, switch Q5 enables a third or "high" voltage input to the transformer T1 to operate the approach lights 24 in a high intensity mode. The high voltage is, for example, on the order of 240 Volts to provide about 10,000 to 18,000 Candela in the approach lights. The low, medium, and high lines connect respectively to the low, medium, and high taps of the transformer T1. The switches Q3, Q4, Q5 are protected by separate RC circuitry across each switch and a separate snubber board 26, such as a model 203440 from Controlled Power Company, that is connected to line L2 and to line L1 and each branch of line N downstream of the switches Q3, Q4, Q5.

A first power sensor D1 is provided in line L2 to enable zero-cross switching of the SCR's, which will be described in detail herein below with reference to the control circuitry. The sensor D1 may be a current transformer or hall-effect transducer, but is preferably a back-to-back diode arrangement for fast and reliable current sensing. For example, the following diodes may be used: Semikron® SKKD260/12, eupec® DD260N12K, or International Rectifier IRKD320/12. In other words, the sensor D1 is comprised of two diodes connected in inverse parallel, wherein the sensor D1 is connected in series in the common line L2 of the transformer T1 primary.

A second load or power sensor CT1 is provided downstream of the first sensor D1 in line L2 with the low branch of line N passing therethrough. The second sensor CT1 is preferably a current transformer and is used to detect power draw through the system for use in load calculations that will be described further herein below with respect to the control circuitry. For example, the following devices may be used: WICC D100-05-L24-03 or WICC D075-05-L24-03 available from W.I.C.C., Ltd. of Washington, Ill.

An approach-light-control bypass switch 28 is connected to lines L1, N, and L2 downstream of the switches Q3, Q4, Q5 to disconnect the transformer T1 from the low, medium, and high switching of power from the power source 12 and thereby provide a direct supply of power to the approach lights 24. As shown here, when the bypass switch 28 is activated, the input lines of line N and line L1 are opened or disconnected from the transformer T1, and a separate control-bypass line is closed, or connected to the transformer T1, to default the approach lights 24 to their medium intensity mode. Alternatively, the bypass switch 28 could be wired to default the approach lights 24 to the low or high modes if desired. In any case, the bypass switch 28 enables immediate return-to-service of one of the intensity modes of the system until the system can be diagnosed and repaired.

Finally, as is well known in the art, transient voltage surge suppressors (TVSS) TS1, TS2 are provided to protect the system 10 from the effects of lightning strikes.

Turning now to the control circuitry of the system 10, and still referring to FIGS. 1–1H, a power supply board 30 is connected to lines L1, and N, and generates isolated direct current levels required for 120VAC and DC operation of an approach light control board or control module 32 and 20VDC operation to a flasher control board 34.

The flasher control board 34 is provided to handshake the approach light controls and input controls to the flasher array. It should be noted that the present invention is capable of operating independently of the flasher control board 34 if desired.

The control module 32 receives power inputs from the power supply 30 as depicted by wire numbers 26–36. Also, the control module 32 receives sensed voltage inputs from the voltage sensors 18, 20, and receives sensed current inputs/input voltages from the current sensor CT1, as depicted by wire numbers 46–51. Additionally, the control module receives sensed current input from the current sensor D1 as depicted by wire numbers 44–45. Moreover, the control module 32 communicates with the bypass switches 16, 28; receiving a push-to-turn signal from the approach-light-control bypass switch 28 as depicted by wire numbers 37–38, and receiving flasher and approach-light-control bypass switch signals as depicted by wires 52 and 53 respectively. Finally, the control module 32 receives flasher power request inputs from the flasher control board 34 as depicted by wire number 19 and also receives approach light intensity mode request inputs from an input source or input control portion 36 of the system as depicted by wire numbers 39–41. The input control portion 36 is provided to accept lighting intensity requests including off, low, medium, and high intensity requests for operation of the approach lights in their off, low, medium, and high states. The input control portion 36 is capable of receiving and communicating a request for an increase or decrease in lighting intensity from one of the approach light states to another. The input control portion 36 may include a bank of manual selector switches 38 for manually selecting among the various modes and may also include hardwired or wireless remote inputs received from a remote source such as a control tower or an approaching aircraft, as is well known to those of ordinary skill in the art. A TVSS TS4 is connected with the input control portion 36 for protection thereof.

The control module 32 provides various outputs including power on/off switch commands to the flasher switches Q1, Q2 as depicted by port K6 on the control module. Primarily, however, the control module provides low, medium, and high lighting intensity commands to the approach light switches Q3, Q4, Q5 as depicted by ports K7–K9 on the control module. Finally, the control module provides output signals, as depicted by wire numbers 2–5, 14, 15 at port K3 on the control module, such as to an electrical cabinet door light array and/or to a wireless transmitter that can provide system status feedback to a control tower.

Figure 2:
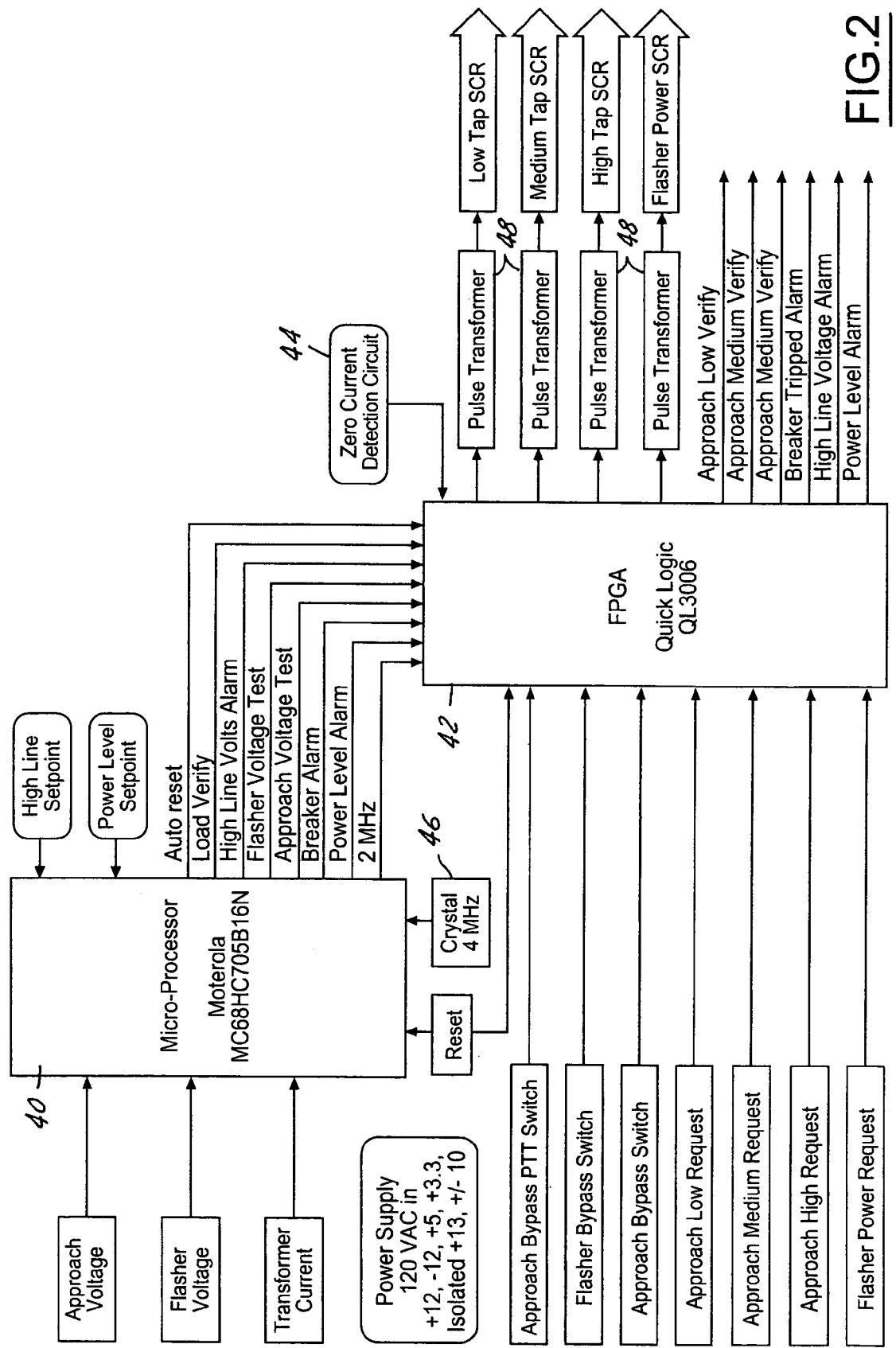
FIG. 2 is a block diagram of a control module of the MALSR control system of FIGS. 1A–1C.

FIG. 2 illustrates a block diagram of the control module 32. As is typical, the control module 32 may include memory (not shown) and interface electronics (not shown) in addition to a controller 40. The interface electronics may conform to protocols such as RS-232, parallel, small computer system interface, and universal serial bus, etc. The controller 40 may be interfaced with memory, such as RAM, ROM, EPROM, and the like, that is configured to provide storage of computer software that provides the functionality of the system and that may be executed by the controller. The memory may also be configured to provide a temporary storage area for data received by the system from various system sensors or from a host device, such as a computer, server, workstation, and the like. The controller 40 may be configured to provide control logic that provides the functionality for the system or a separate device may be coupled to the controller 40 to provide control logic such as a field-programmable-gate-array (FPGA) 42. In this respect, the controller 40 may encompass a microprocessor, a microcontroller, an application specific integrated circuit, and the like. Preferably, the control module 32 includes a Motorola® MC68HC705B16N microprocessor 40 that provides output to a QuickLogic® QL3006 FPGA 42.

The method of the present invention may be performed as a computer program and various setpoints and the like may be stored in memory as a look-up table or the like. The computer program may exist in a variety of forms both active and inactive. For example, the computer program can exist as a software program comprised of program instructions in source code, object code, executable code or other formats; a firmware program; hardware description language (HDL) files; or the like. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the method of the present invention may be performed by any electronic device capable of executing the above-described functions.

Figure 3A:
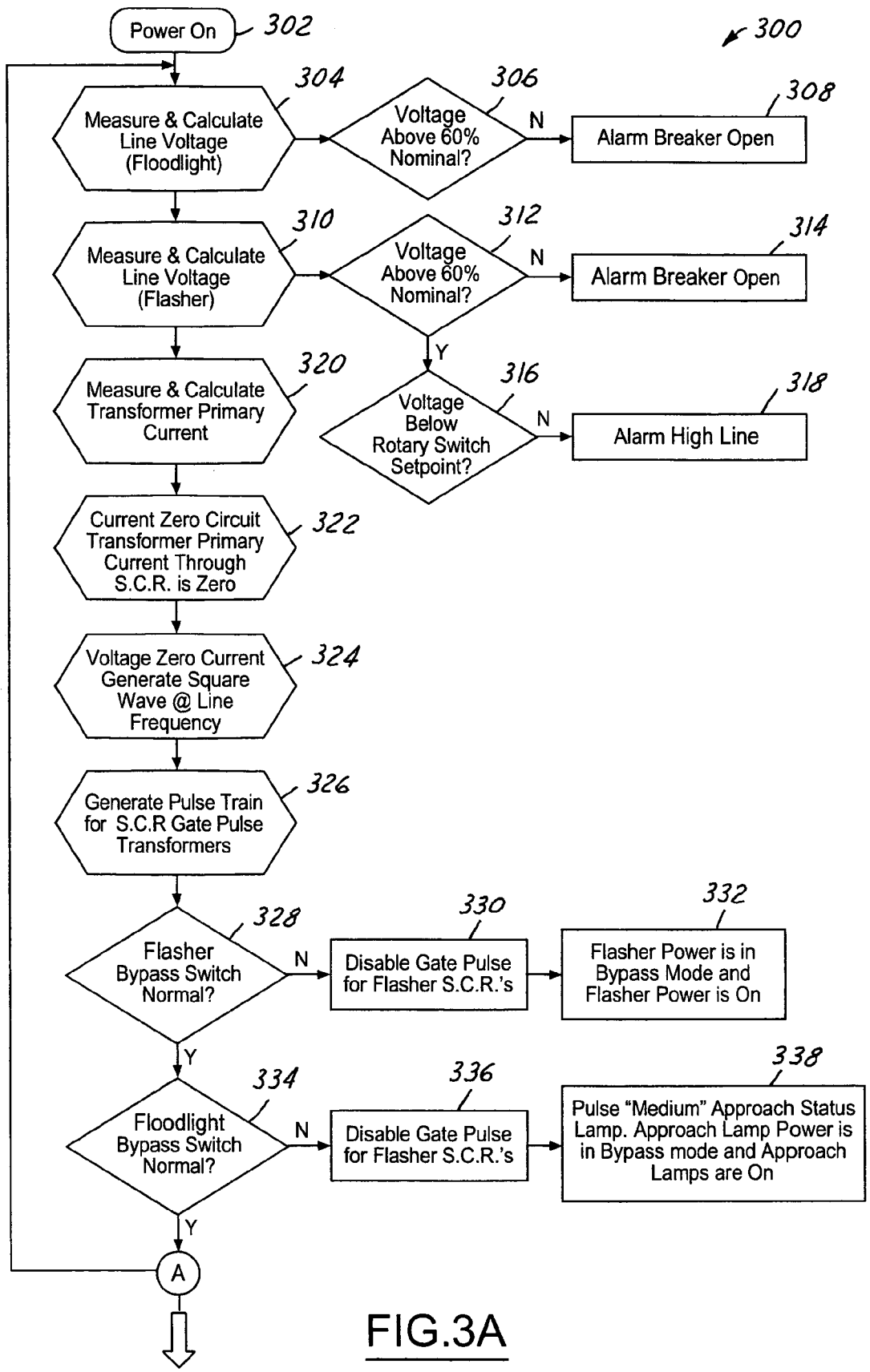
FIGS. 3A and 3B, when joined together, comprises a single flow chart of an exemplary process that is carried out by the control module of FIG. 2.
Figure 3B:
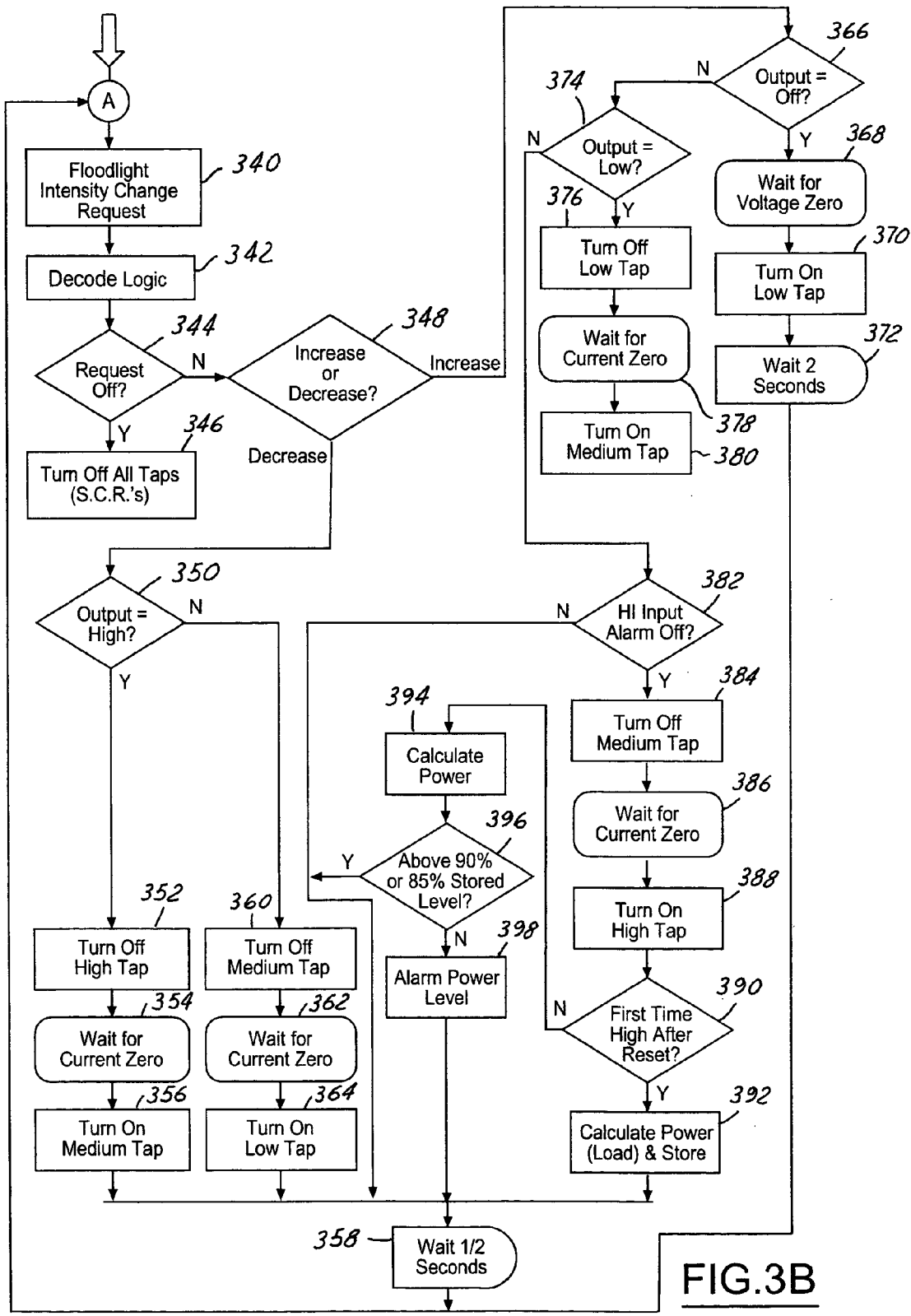

Operation of the microprocessor 40 and FPGA 42 is best described with simultaneous reference to the system schematic of FIGS. 1–1H and to the algorithms loaded to or embedded therein and depicted by FIGS. 3A and 3B.

FIGS. 3A and 3B depict the algorithms or process 300 used by the microprocessor 40 and FPGA 42 of FIG. 2. FIG. 3A, in particular, is a flow chart that primarily depicts the operation of the microprocessor 40. After a power-on step 302, the microprocessor reads voltages and current in the power circuitry of the system of FIGS. 1–1H. The microprocessor 40 is isolated from the voltage and current inputs from the power circuitry of the system 10 by any suitable isolators, but is preferably isolated by opto-isolators or couplers and isolation transformers (not shown). Any suitable opto-coupler may be used such as HCPL-3700 available from the Hewlett-Packard Company, or the like. The microprocessor 40 reads voltages sensed by the voltage sensors 18, 20 of the system 10 of FIGS. 1–1H. In particular, at step 304, the microprocessor measures and calculates the actual approach light line voltage. At step 306 the actual approach light line voltage is compared to a predetermined high line voltage setpoint such as 60% of nominal line voltage. If the actual approach light line voltage is not above the predetermined setpoint, then the microprocessor 40 outputs a breaker-open alarm through the FPGA 42, shown as step 308. At step 310, the microprocessor measures and calculates the actual flasher line voltage. At step 312 the actual flasher line voltage is compared to a predetermined high line voltage setpoint such as 60% of nominal line voltage. If the actual flasher line voltage is not above the predetermined setpoint, then the microprocessor 40 outputs a breaker-open alarm through the FPGA 42, shown as step 314.

At step 316, the voltage is compared to a rotary switch setpoint. If the actual line voltage is greater than the predetermined rotary switch setpoint, then the microprocessor 40 outputs a high line voltage alarm through the FPGA 42, as depicted by step 318.

Still referring to FIG. 3A, the process 300 advances to step 320 wherein the microprocessor measures and calculates current flowing to the primary side of the transformer T1 of the system of FIGS. 1–1H, using the current sensed from the power sensor CT1, for purposes of monitoring load or power drawn by the approach lights.

Figure 2A:
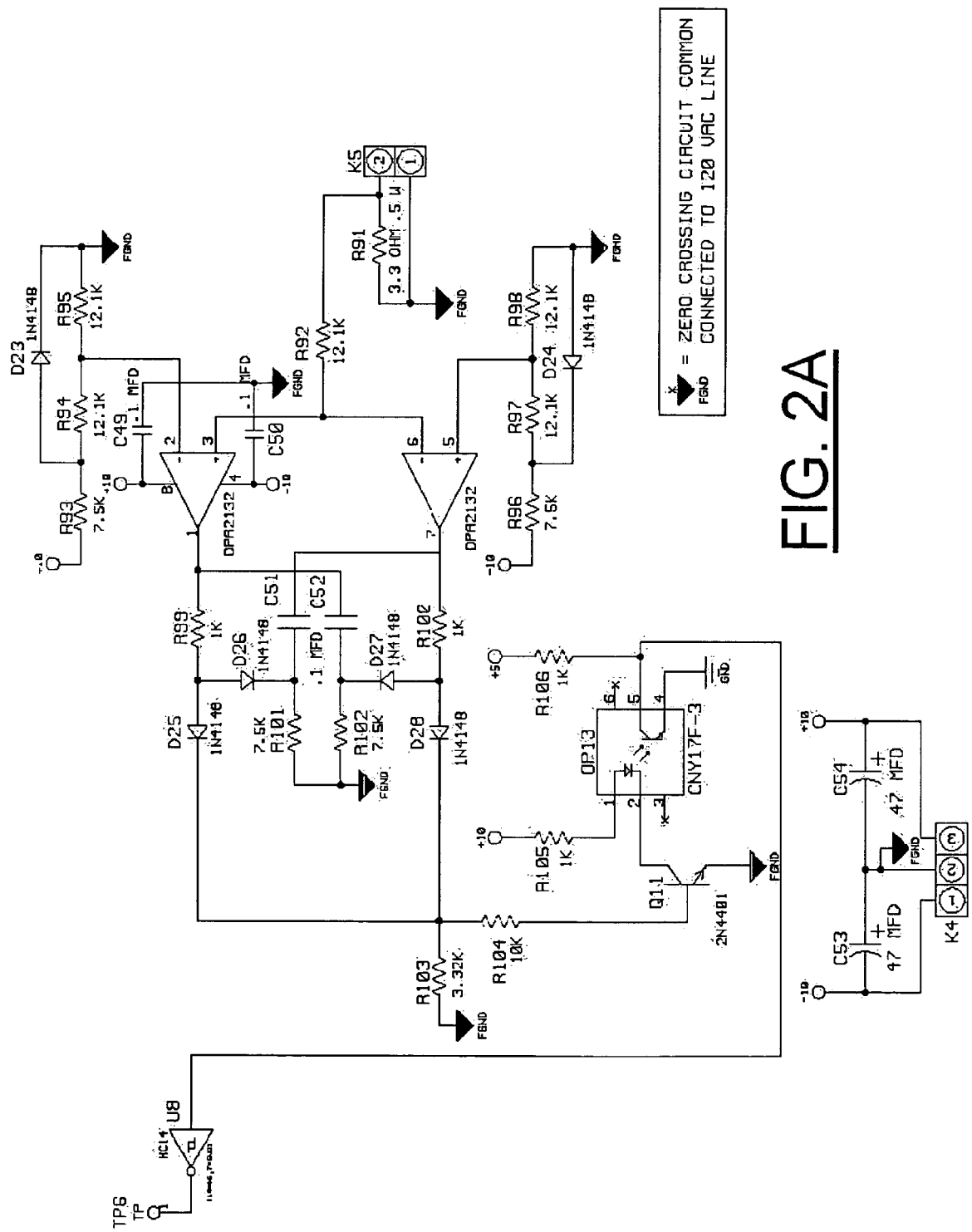
FIG. 2A is a schematic of a zero-cross circuit depicted in block diagram form in FIG. 2.

At step 322, the power flow through a presently closed, or "ON", subject switch of the plurality of switches Q3, Q4, Q5 of the system of FIGS. 1–1H is inferred by a voltage drop across the current sensor D1. This step is carried out by a zero-amperage current detection circuit 44 as depicted in the block diagram of FIG. 2. For purposes of example only, the circuit 44 may be a zero-cross detection circuit as depicted in detail in FIG. 2A. The present invention contemplates, however, that any suitable zero-cross current detection circuit may be used. This circuit 44 monitors the voltage drop across the back-to-back diode sensor D1 in line L2. If the voltage drop is less than 0.6 Volts, then it is inferred that the current flow through the subject switch has fallen to nearly zero Amps. If the current maintains at this level, then the subject presently-closed switch will open or revert to its "OFF" state. By detecting and measuring the duration that the current flow is in this state, it is possible to ensure that the subject switch is in its OFF state and that it is safe to activate, or turn ON, another of the plurality of switches Q3, Q4, Q5 without damaging the system 10. The present invention contemplates that the power sensors D1 and CT1 can also operate as or be characterized as voltage or current sensors.

At step 324, the microprocessor 40 generates a square wave at line frequency with input pulses received from a four MHz crystal clock 46.

At step 326, the microprocessor 40 generates a pulse train of 15–18 Volt pulses from a four MHz crystal clock 46 that is capable of firing the SCR's. The pulse train is derived from the crystal clock 46 and has a frequency of 7.8 kHz and a duty cycle of about 16 µsec ON and about 112 µsec OFF. Speed-up pulses assure faster turn on of the SCR's, and are provided at voltage zero, current zero, and initial turn-on of any given subject switch, in which case the duty cycle of the pulse train is changed to about 16 µsec ON and about 64 µsec OFF. Any suitable duration of the speed-up pulses may be selected, but is preferably 500 µsec.

At step 328, the microprocessor 40 monitors the flasher-control bypass switch 16 of the system 10 of FIGS. 1–1H. If the state of the switch 16 is not normal (i.e. L1, L2 contacts closed), then the microprocessor 40 disables gate pulses for the flasher switches Q1, Q2 at step 330. As depicted by step 332, the microprocessor 40 then sends output signals to indicate that the flasher circuit is in bypass mode and that flasher power is in an ON state.

At step 334, the microprocessor 40 monitors the approach-light-control bypass switch 28 of the system 10 of FIGS. 1–1H. If the state of the switch 28 is not normal (i.e. L1, N, L2 contacts closed), then the microprocessor 40 disables gate pulses for the approach light switches Q3, Q4, Q5 at step 336. As depicted by step 338, the microprocessor

40 then sends output signals to indicate that the approach light circuit is in bypass mode and that the approach lights are in an ON state.

Referring now to FIG. 3B, there is depicted a continuation of the flow chart of FIG. 3A that primarily depicts the operation of the FPGA 42, which commands forced approach light intensity changes based on requested intensity change requests. As an overview, approach light intensity changes are performed in a forced sequential manner. This may also be referred to as forced "staircasing", "staircase switching", or progressive intensity changing. In any case, when an input request calls for an increase in intensity from an approach light OFF mode, the low tap switch Q3 is gated ON for a period of approximately two seconds, regardless of the actual level of intensity requested. This allows the approach light lamps an opportunity to "warm up" before being fully powered by activation of the high tap switch, thereby extending the life of the approach light lamps. At this point, if the request received was for the low intensity setting, then the control module 32 just returns to a system monitoring state. If however, the request received was for a higher intensity setting (i.e. medium or high), then the low tap switch Q3 is deactivated after a predetermined warm-up delay and the medium tap switch Q4 is activated immediately thereafter so as to avoid interruption of the current through the primary of the transformer T1. The predetermined warm-up delay is preferably approximately two seconds but may be less or more if desired. If the request received was for the medium intensity setting, then the control module 32 just returns to a system monitoring state. If, however, the request received was for the high intensity setting, then the medium tap switch Q4 is gated for a predetermined delay period (e.g. about ½ of a second) before it is deactivated and the high tap switch Q5 is activated immediately thereafter so as to avoid interruption of the current through the primary of the transformer T1. In other words, the off-on gating of adjacent switches is carried out in a synchronous manner with predetermined delays therebetween to avoid high transformer excitation currents while enabling substantially continuous power flow. This process of progressive or sequential switching is provided to reduce in-rush of current through the primary of the transformer T1 when a "higher" (medium or high) voltage is applied through an adjacent "higher" (medium or high) tap switch to the transformer T1. In other words, with the built-in predetermined delays and by progressively activating the low tap switch, then the medium tap switch, and finally the high tap switch, the in-rush current is reduced by reducing the differentials in the amplitude of the applied voltage and/or current.

Figure 4A:
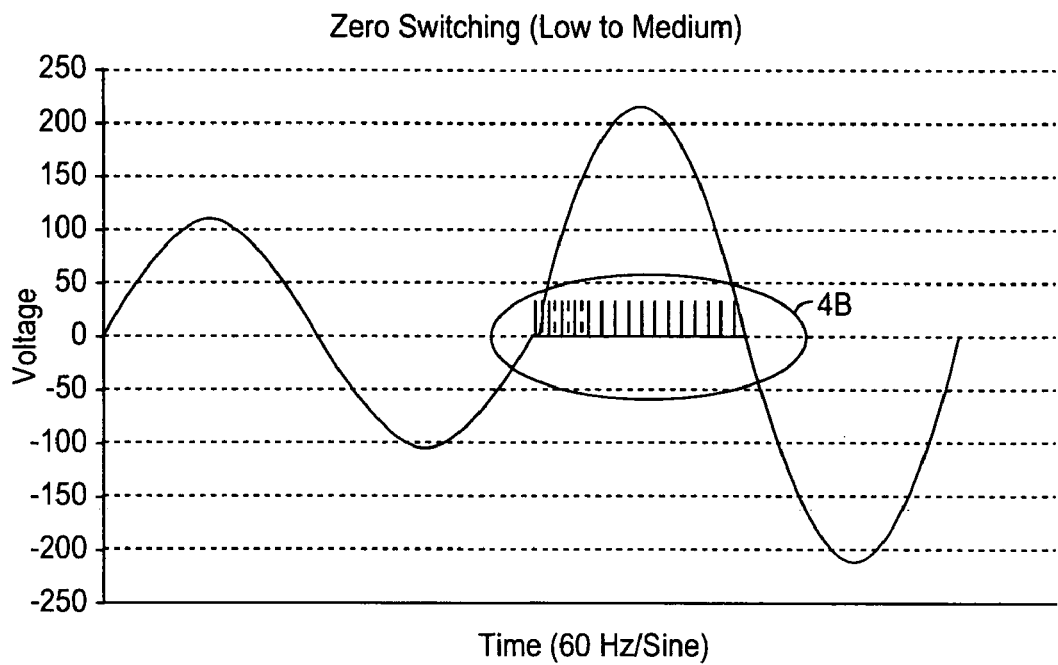
FIGS. 4A and 4B are graphical representations of a sine wave of system power and of a pulse train generated by the control module of FIG. 2 in accordance with the process steps of FIGS. 3A and 3B.

The forced sequential switching of the present invention can be visualized using a sine wave plot of alternating current or voltage, such as that depicted in FIG. 4A. The power received from the utility company or on-site generator is alternating current (AC) power that swings positive and negative in a sine wave in sinusoidal cycles sixty times per second (60 Hz). In each sinusoidal cycle, the power departs from a "positive" region above a zero power threshold and enters a "negative" region below the zero power threshold.

At the instant that the sine wave "crosses" the zero power threshold, no power is present in the line. Thus, the instantaneous value of power automatically becomes zero twice in each cycle. For a brief period of time after the zero crossing, the power remains so low as to be negligible or substantially absent. It is during this timeframe that the control logic interprets the input request signals, eliminates any switching overlap or discontinuity, and initiates a controlled switching routine that assures staircased increases in intensity from a low tap start-up. Power level transitions between switches commence substantially at the natural sine commutation, wherein a presently activated switch is deactivated and the next or adjacent switch activated. Preferably, this window of time is within 300 μsec of detection of the zero crossing, which translates into less than about 7 degrees of a 360 degree sine wave at 60 Hz. In other words, the present switch is deactivated upon the zero-crossing of the current sine wave and, thereafter, the next switch is activated within about 300 μsec. Thus, the controller need not interrupt the power flowing through the plurality of switches to the transformer T1, but need only synchronize the deactivation of one switch and activation of an adjacent one of the switches to redirect the power flow at the zero-crossing from one switch to the other. This basically amounts to nearly seamless switching from one power level to another power level, and can also be carried out to decrease power levels as well as increase power levels.

Figure 4B:
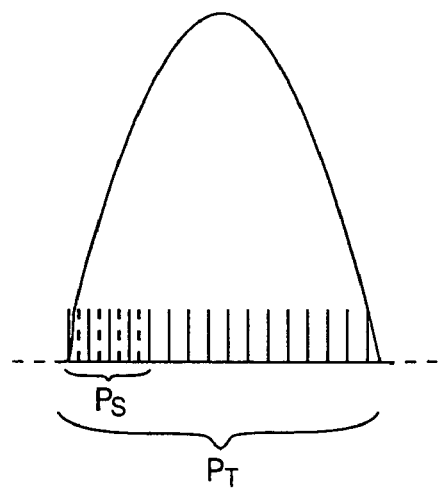

FIG. 4B illustrates a first half-cycle of a sine wave of current across the medium tap switch Q4 and the pulse train ($P_T$) generated by the microprocessor 40 and crystal clock with the speed-up pulses ($P_s$) applied at the initial activation of the switch Q4 for fast gating thereof. The speed up pulses may also be applied at every voltage zero or current zero crossing of the sine wave. The speed up pulses are generated for about 500 μsec at a time. The pulse train duty cycle is about 16 μsec ON and about 112 μsec OFF and, during the speed up cycle, is about 16 μsec ON and about 64 μsec OFF. Preferably, the FPGA 42 gates the SCR's by a logical OR of the pulse train and speed-up pulses with a power present acknowledgement, such as from the voltage sensor 18.

Figure 4C:
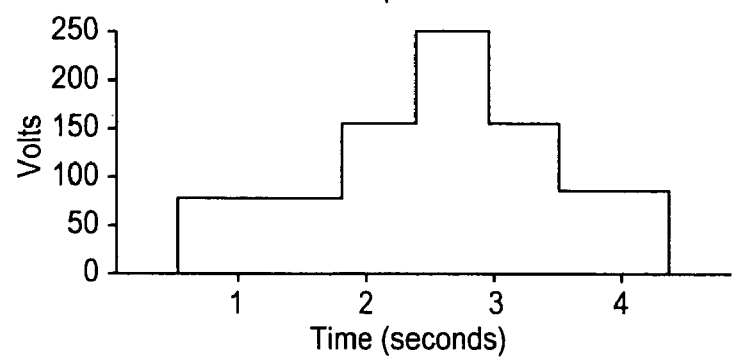
FIG. 4C is a graphical representation of an overall voltage envelope of a typical off-low-medium-high-medium-low switching sequence according to an embodiment of the present invention.

FIG. 4C illustrates an overall voltage envelope of a typical off-low-medium-high-medium-low switching sequence. The off to low switching takes approximately two seconds. Each of the low to medium and medium to high switching takes approximately 0.5 seconds. Each of the downward intensity switching from high to medium, and medium to low takes approximately 0.5 seconds.

Steps 340 through 398 represent just one example of many possible algorithms for carrying out the process described above. At step 340, the control module 32 monitors approach light intensity change requests received from the input control portion 36 of the system 10 of FIGS. 1–1H.

At step 342, binary-format requests from the input control 36 are decoded from, for example, a 011 format to a 010 format, which is compatible with the firing of SCR's.

At step 344, it is determined if an incoming request is a system OFF request. If so, then power is cut to all of the switches Q1, Q2, Q3, Q4, Q5, as depicted by step 346. As shown in FIG. 2, the FPGA 42 is linked to the switches Q1–Q5 by a bank of pulse transformers 48 that suitably insulate the control module 32 from the high power of the power circuitry. Any suitable pulse transformers may be used, such as the following transformers: Dale PT-20-205 from Vishay Intertechnology of Malvern, Pa. or model #11Z3300 from Vitec Electronics Corporation of Carlsbad, Calif.

If, at step 344, the FPGA 42 determines that the incoming request is not a system OFF request, then the FPGA 42 next determines whether the intensity change request is an increase or a decrease request at step 348. If the request is a decrease in intensity, then the process proceeds to step 350.

Next, it is determined at step 350 whether the present state of the approach lights is in the high mode. If the present state is the high intensity mode, then the power to the high tap switch Q5 is cut at step 352. Then, at step 354 the FPGA 42 waits for the alternating current to cross the zero line threshold at which point the medium tap switch Q4 is turned on at step 356. Finally, at step 358, a pause of ½ of one second is carried out to permit the transformer T1 to stabilize and the process returns to step 304.

Returning to step 350, if the present state is not the high intensity mode, then power to the medium tap switch Q4 is cut at step 360. Then, at step 362 the FPGA 42 waits for the alternating current to cross the zero line threshold at which point the low tap switch Q3 is turned on at step 364. Finally, at step 358, a pause of ½ of one second is carried out to permit the transformer T1 to stabilize and the process returns to step 304.

Returning to step 348, the FPGA 42 determines whether the intensity change request is an increase or a decrease request. If the request is an increase in intensity, then the process proceeds to step 366. The FPGA 42 next determines at step 366 whether the present state of the approach lights is OFF. If the present state of the approach lights is OFF, then the process waits for the current signal to cross a zero level at step 368. Once the current has crossed the zero threshold, the low tap switch Q3 is activated at step 370 thereby supplying low voltage to the transformer T1 primary to power the approach lights to a low intensity level. Before proceeding back to step 304, however, the process waits for a period of two seconds at step 372, which allows the approach light lamps to warm up.

Returning to step 366, if it is determined that the present state of the approach lights is not OFF, then the process advances to step 374. Here it is determined whether or not the present state of the approach lights is at the low intensity level. If the present state is low, then the low tap switch Q3 is deactivated at step 376. Thereafter, the process waits for the current to cross the zero threshold at step 378, at which instant of time the medium tap switch Q4 is activated at step 380. Again, the process then waits for ½ of a second at step 358 before returning to step 304.

Returning to step 374, if it is determined that the present state of the approach lights is not low, i.e. medium, then the process advances to step 382 wherein it is determined whether the high line voltage alarm is OFF. If the alarm is not OFF, then the process skips to the wait step 358 before returning to step 304. This step is provided to ensure that there is not an excessive level of incoming line voltage that could damage the lamps. It is estimated that this step may extend the life of the approach light lamps, perhaps by a factor of two or more. If, however, the alarm is OFF, then the process continues to step 384 wherein the medium tap switch Q4 is deactivated. At step 386, the process waits for the current signal to cross the zero threshold, at which point the high tap switch Q5 is then activated at step 388.

The final sequence of steps from 390 to 398 is provided as an inexpensive and reliable method of prolonging the life of approach light lamps. In step 390, it is determined whether this is the first time the high tap switch Q5 has been activated, e.g. since a manual reset last occurred, or if it is the first time the system has been used, or a power outage led to reset of the system. If so, the power being drawn by the approach lights is calculated using input from the current sensor CT1 and stored as a baseline load at step 392. If, however, at step 390 it is determined that this is not the first time the high tap switch Q5 has been activated since a reset, etc., then the process advances to step 394 wherein present load or power drawn by the approach lights is calculated. At step 396 it is determined whether the present load is above a predetermined percentage of the stored baseline level, such as 85% or 90%. If so, then the process simply advances to the wait step 358 before returning to step 304. If not, however, then a power level alarm signal is output to alert personnel that an unacceptable number of approach light lamps may be burned out and in need of replacement. Thereafter the process passes through step 358 and repeats at step 302.

To summarize, the present invention is a significant improvement over prior art MALSR systems and methods. Prior art systems are susceptible to failures due to massive surges and swings in transformer excitation. Previous attempts to mitigate these massive surges often involve adding expensive and sophisticated electronics to filter or soften the excitation changes. In contrast, the present invention provides a system and method of operating the system that progressively increases the intensity of runway approach lighting in response to requests for higher intensity settings, thereby avoiding massive surges and swings in transformer excitation and consequential problems. The present invention includes a back-to-back diode power sensor and a plurality of independently controlled inverse-parallel solid-state switches that, together, enable zero power level transition between at least three lighting intensity states. The solid-state switches are switched within about 7 degrees of zero power crossing, inducing less than 1% THD. A control module synchronizes the deactivation of one switch before activation of another switch while avoiding power dropout through the switches yet also avoiding damaging overlap or simultaneous operation of the switches. The control module includes digital processing that provides accurate power phase delays and dual high frequency pulsing for assured gating of the switches regardless of distorted power feeds and inadvertent SCR commutations. The system operates approach flashers and approach lights in a parallel redundant mode, wherein either control of the flashers or approach lights may be disconnected for diagnosis and service while leaving the other control operative. The system also includes an emergency bypass switch. In the event of any failure that may inhibit operation of the approach lighting, the bypass switch can be activated to default the approach lights to one of the intensity levels until diagnosis and service can be conducted. While in the emergency mode, the flashers operate normally if the flasher control board is operative. All of the TVSS networks are provided independent with respect to the control boards, so that changing the TVSS networks does not require changing either of the control boards. The present invention thus eliminates conventional, frequent nuisance breaker tripping in a MALSR, and eliminates excessive transformer excitation and controls failures. The present invention also enables optimized use of solid-state components and significantly extends lamp life of approach lighting and decreases flasher control card vulnerability to surges.

While the forms of the invention herein disclosed constitute a presently preferred embodiment, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

What is claimed is:

1. An aircraft landing guidance system for visually guiding an aircraft in its landing approach to a runway having an approach area equipped with a plurality of lights operable in accordance with a plurality of intensity states including at least an off state, a low state, a medium state, and a high state, said plurality of lights being communicated to a transformer at a secondary side thereof, said transformer having a primary side with a plurality of taps including at least low, medium, and high taps that correspond respectively to said low, medium, and high states of said plurality of lights, said system comprising:
at least one input source for requesting said plurality of lights to operate in accordance with said plurality of intensity states, said at least one input source receives a plurality of lighting intensity requests including an off request, a low request, a medium request, and a high request that correspond respectively to said low, medium, and high states of said plurality of lights, said at least one input source being capable of receiving a request for an increase in lighting intensity from one of said states to another;
a plurality of power input lines communicated to said plurality of taps, said plurality of power input lines including a low line, a medium line, and a high line corresponding respectively to said low, medium, and high taps;
a plurality of switches for switching between said plurality of taps of said transformer, said plurality of switches including a low tap switch in said low line, a medium tap switch in said medium line, and a high tap switch in said high line; and
a control module in communication with said at least one input source and said plurality of switches, said control module having control logic for controlling operation of said plurality of switches in a predetermined sequential manner based on input received from said input source, said control logic activates at least one of said plurality of switches in response to said request for an increase in lighting intensity from said input source, said control logic first activates said low tap switch for a first predetermined time interval before activating said medium tap switch for at least a second predetermined time interval.

2. The system of claim 1 wherein said control logic of said control module first activates said low tap switch for approximately two seconds before activating said medium tap switch and then activates said medium tap switch for approximately ¼ to one second before activating said high tap switch.

3. The system of claim 1 further comprising:
a common power line connected to said transformer;
a first power sensor positioned in said common power line for sensing AC power flowing therethrough;
said control module further including a zero power detection circuit in communication with said first power sensor, said control logic of said control module activates and deactivates said plurality of switches substantially when said power crosses a zero level.

4. The system of claim 3 wherein said control logic of said control module activates and deactivates said plurality of switches within about 300 microseconds of said power crossing said zero level.

5. The system of claim 4 wherein said power sensor comprises a back-to-back diode.

6. The system of claim 3 wherein said control module activates said plurality of switches by generating speed-up pulses and applying said speed-up pulses to at least one of said plurality of switches to activate said at least one of said plurality of switches.

7. The system of claim 6 wherein said control module applies said speed-up pulses to said at least one of said plurality of switches within about 500 microseconds of said power crossing said zero level.

8. The system of claim 1 further comprising:
a second power sensor positioned in said common power line and in communication with said low line of said plurality of power input lines; and
said control logic of said control module senses power flowing to said transformer as an indicator of power draw of said plurality of lights when any of said switches is activated, said control logic compares said sensed power to a previously stored power value when said plurality of lights is in said high state, said control logic sends an alarm signal if said sensed power is less than a predetermined percentage of said previously stored power value.

9. The system of claim 1 wherein said control system further includes a bypass switch having a first position in which said plurality of power input lines are connected to said transformer, and a second position in which said plurality of power input lines are disconnected from said transformer.

10. The system of claim 9 wherein said plurality of power input lines includes a control bypass line that is connected to one of said plurality of taps of said transformer when said bypass switch is in said second position.

11. The system of claim 1 wherein said low tap and said medium tap switches of said plurality of switches are discrete-type solid-state switches capable of switching at least 95 continuous Amps and at least 1750 surge Amps, further wherein said high tap switch of said plurality of switches is a discrete-type solid-state switch capable of switching at least 250 continuous Amps and at least 8000 surge Amps.

12. The system of claim 1 wherein said control module further includes a plurality of pulse transformers to insulate said control module from said plurality of switches.

13. A method of visually guiding an aircraft in its landing approach to a runway having an approach area equipped with a plurality of lights operable in accordance with a plurality of intensity states including at least an off state, a low state, a medium state, and a high state, said plurality of lights being communicated with a transformer at a secondary side thereof, said transformer having a primary side with a plurality of taps including at least low, medium, and high taps that correspond respectively to said low, medium, and high states of said plurality of lights, said method comprising the steps of:
receiving and processing a plurality of lighting intensity requests including an off request, a low request, a medium request, and a high request that correspond respectively to said low, medium, and high states of said plurality of lights; and
switching supply of AC power between said plurality of taps of said transformer in response to a request for an increase in lighting intensity from said receiving and processing step, said switching step including sequentially supplying said power to said plurality of taps by supplying said power to said low tap for a first predetermined time interval before supplying said power to said medium tap.

14. The method of claim 13 wherein said switching step further includes further sequentially supplying said power to said plurality of taps by supplying said power to said low tap for approximately two seconds before supplying said power to said medium tap and then supplying said power to said medium tap for a second predetermined time interval before supplying said power to said high tap.

15. The method of claim 13 further comprising the step of sensing said power supplied to said transformer, wherein said switching step is carried out substantially when said power crosses a zero level.

16. The method of claim 15 wherein said switching step is carried out within about 300 microseconds of said power crossing a zero level.

17. The method of claim 13 further comprising the steps of:
sensing power flowing to said transformer as an indicator of power draw of said plurality of lights when said high tap is activated;
comparing said power from said sensing power step to a previously stored power value; and
sending an alarm signal if said power from said sensing power step is less than a predetermined percentage of said previously stored power value.

* * * * *